May 13, 1952  R. J. OLANDER  2,596,282
SHOCK ABSORBER FOR RAILWAY CAR TRUCKS
Filed April 18, 1950  2 SHEETS—SHEET 1
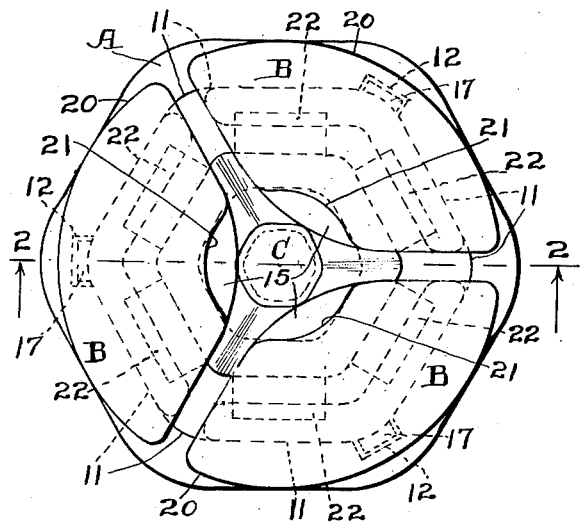
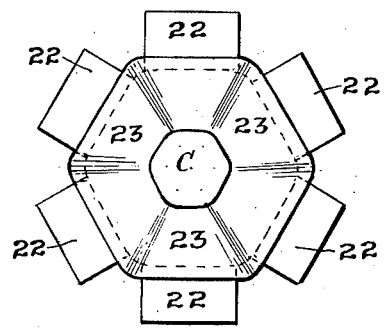
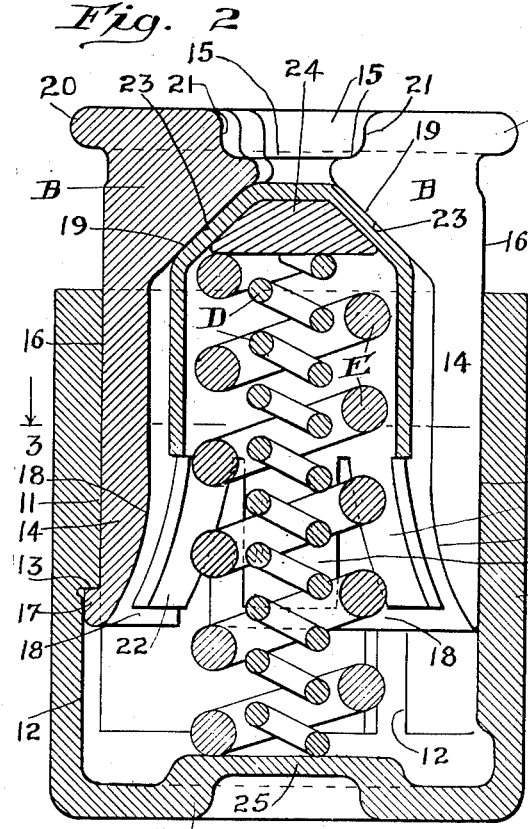
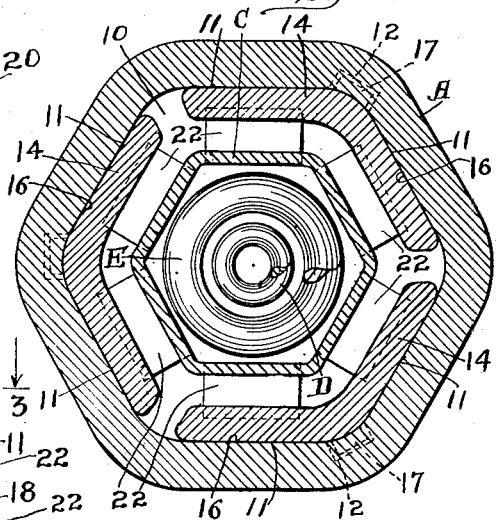
Inventor:
Roland J. Olander.
By Henry Fuchs
Atty.

May 13, 1952 R. J. OLANDER 2,596,282
SHOCK ABSORBER FOR RAILWAY CAR TRUCKS
Filed April 18, 1950 2 SHEETS—SHEET 2

Inventor.
Roland J. Olander.
By Henry Fuchs
Atty.

Patented May 13, 1952

2,596,282

UNITED STATES PATENT OFFICE 2,596,282

SHOCK ABSORBER FOR RAILWAY CAR TRUCKS

Roland J. Olander, Chicago, Ill., assignor to W. H. Miner, Inc., Chicago, Ill., a corporation of Delaware Application April 18, 1950, Serial No. 156,633

3 Claims. (Cl. 267—9)

1

This invention relates to improvements in friction shock absorbers for snubbing or dampening the action of railway car truck springs.

One object of the invention is to provide a friction shock absorber of the character indicated, comprising a friction casing, elongated friction shoes slidingly telescoped within the casing, a combined wedge and follower member cooperating with the outer ends of the shoes for spreading the same apart, retaining lugs on the shoes at the inner ends thereof engaging stop shoulders on the casing, and spring means within the casing for forcing the wedge means into wedging engagement with the shoes, and opposing movement of said member and shoes inwardly of the casing, wherein the combined wedge and follower member is provided with resilient arms cooperating with the inner ends of the shoes for spreading said inner ends apart with the retaining lugs of the shoes engaged with the stop shoulders of the casing, and preventing lateral inward tilting of the shoes at said inner ends, which might otherwise occur and disturb proper contact between the friction surfaces of the shoes and casing.

A further object of the invention is to provide in a mechanism as set forth in the preceding paragraph, in addition to the resilient arms at the inner end of the combined wedge and spring follower member, resilient arms at the outer end of the same, which act on the outer ends of the shoes and tend to contract said shoes at said outer ends, thereby spreading the inner ends apart to maintain proper true contact between the friction surfaces of the shoes and casing and hold the lugs of the shoes engaged with the stop shoulders of the casing.

Other objects of the invention will more clearly appear from the description and claims hereinafter following.

Figure 5:
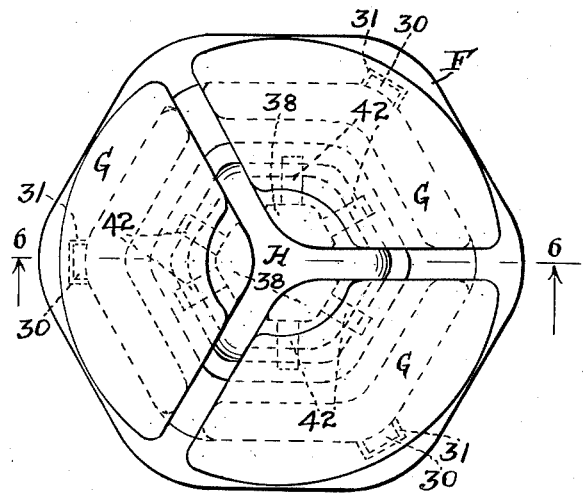
Figure 6:
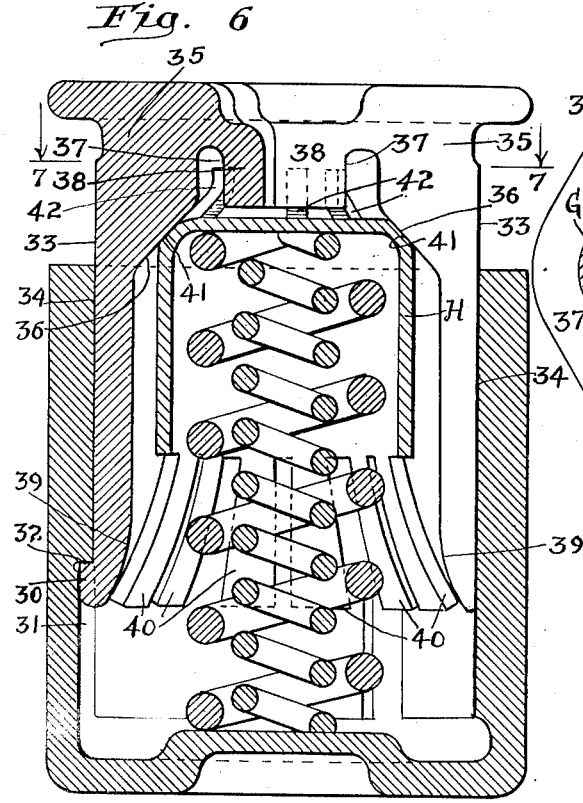
Figure 7:
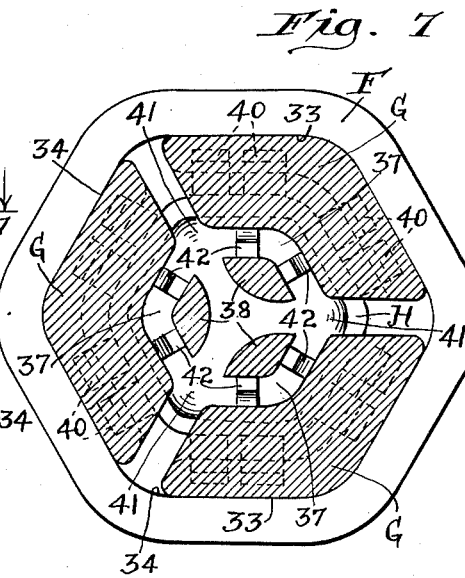

In the accompanying drawings forming a part of this specification, Figure 1 is a top plan view of my improved shock absorber. Figure 2 is a transverse, vertical sectional view, corresponding substantially to the line 2—2 of Figure 1. Figure 3 is a horizontal sectional view, corresponding substantially to the line 3—3 of Figure 2. Figure 4 is a top plan view of the combined wedge and spring follower member of my improved mechanism. Figure 5 is a view similar to Figure 1, illustrating another embodiment of the invention. Figure 6 is a transverse, vertical sectional view, corresponding substantially to the line 6—6 of Figure 5. Figure 7 is a horizontal sectional view, corresponding substantially to the line 7—7

Figure 8:
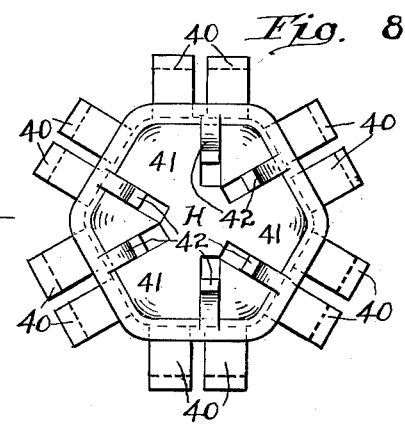

2 of Figure 6. Figure 8 is a top plan view of the combined wedge and spring follower member illustrated in Figures 5, 6, and 7.

Referring first to the embodiment of the invention illustrated in Figures 1 to 4 inclusive, my improved shock absorber comprises broadly a friction casing A, three friction shoes B—B—B, a combined wedge and spring follower member C, and springs D and E.

The casing A is in the form of a tubular member of hexagonal, transverse cross section, open at its top end and closed by a transverse wall 10 at its bottom end. The interior of the casing A presents three lengthwise extending friction surfaces 11—11—11 of V-shaped, transverse cross section, each V-shaped surface 11 being formed by two adjacent walls of the hexagonal casing. At alternate corners, the interior vertical walls of the casing are slotted in vertical direction at their lower ends, as indicated at 12—12—12. The transverse end walls closing the upper ends of the slots 12—12—12 provide horizontal stop shoulders 13—13—13 for a purpose hereinafter pointed out.

The friction shoes B are three in number and are arranged symmetrically about the vertical central axis of the casing in sliding telescoped relation with the latter. Each shoe comprises an elongated platelike section 14 of V-shaped, transverse cross section, and a laterally inwardly protruding enlarged head 15 at the top end of the plate section 14. Each shoe B presents a lengthwise extending friction surface 16 on its outer side, of V-shaped transverse cross section, engaged with one of the V-shaped friction surfaces 11 of the casing. At the lower end of the plate section 14 of each shoe B is provided a laterally outwardly projecting retaining lug 17, which is located at the corner presented by the V-shaped surface of said section, and is engaged in the corresponding slot 12 of the casing beneath the shoulder 13. As will be evident, engagement of the retaining lug 17 of each shoe with the corresponding stop shoulder of the casing positively limits outward movement of said shoe. On the inner side, the lower end portion of the plate section 14 of each shoe is rounded off and presents an upwardly curved surface 18 on each face of the V-shaped portion thereof, the three shoes thus, in effect, flaring outwardly at their lower ends. The laterally inwardly projecting head 15 of each shoe presents a flat wedge face 19 on its underneath side. The wedge faces 19—19—19 of the three shoes diverge inwardly or downwardly, as clearly illustrated in Figure 2. At the upper end, each shoe has a laterally outwardly projecting, horizontal flange 20 which overhangs the upper end of the casing and is adapted to engage said upper end to positively limit inward movement of the shoes and compression of the mechanism. The heads 15—15—15 of the three shoes B—B—B are recessed on their inner sides, as indicated at 21—21—21, to provide an opening adapted to accommodate the usual spring centering lug of the top spring plate of a cluster of truck springs.

The combined wedge and spring follower member C is in the form of a tubular cup of hexagonal, transverse cross section, closed at its upper end and open at its bottom end. The cup-shaped member C is formed of spring steel and is vertically slotted at the lower end to provide spring arms 22—22. The spring arms 22—22 flare outwardly, or are curved lengthwise, and bear on the lengthwise curved, interior surfaces 18—18 at the lower ends of the shoes B. The upper or closed end of the member C is contracted, as shown, and presents three upwardly converging wedge faces 23—23—23 on its outer side, engaged respectively with the wedge faces 19—19—19 of the shoes B—B—B.

The springs D and E are both in the forms of helical coils arranged lengthwise within the casing A. The springs D and E react between the bottom wall 10 of the casing and the member C, both springs having the upper ends bearing on a filler block 24 seated in the contracted upper end of the member C. The spring E surrounds the spring D and is heavier than the latter. At their lower ends, the springs D and E both bear on an upstanding hollow boss 25 on the bottom wall 10 of the casing. The boss 25 provides a downwardly opening seat at the bottom end of the casing, adapted to accommodate the usual spring centering lug of the bottom spring plate of a cluster of springs of a railway car truck.

The operation of my improved shock absorber, as illustrated in Figures 1 to 4 inclusive, is as follows: Upon the shoes B—B—B being forced inwardly of the casing A, they are wedged apart by the spring resisted combined wedge and spring follower member C, thereby providing high frictional resistance to absorb the shocks and dampen the action of the truck springs of a railway car. During spreading action by the member C, any tendency of the lower ends of the shoes to rock inwardly, which would interfere with proper operation of the mechanism, is overcome by the spreading pressure exerted by the resilient arms or fingers 22—22 at the lower end of the member C. The shoes are thus at all times held in true frictional contact with the friction surfaces of the casing, with the lugs 17 thereof engaged in the grooves 12 and projecting beneath the stop shoulders 13.

Referring next to the embodiment of the invention illustrated in Figures 5, 6, 7, and 8, the design is similar to that shown in Figures 1 to 4 inclusive, with the exception that the combined wedge and spring follower member has additional resilient means at the upper end, tending to press said upper ends inwardly toward each other, thereby further counteracting any tendency of the shoes to rock inwardly.

The construction illustrated in Figures 5 to 7, inclusive, includes a friction casing F identical with the friction casing A hereinbefore described and three shoes G—G—G having lugs 30 at their lower ends engaged in slots 31 in the casing F and engageable with shoulders 32 at the upper ends of said slots. The shoes G—G—G have friction surfaces 33—33—33 on their outer sides of V-shaped, transverse section, engaging V-shaped friction surfaces 34—34—34 on the casing. At their upper ends, the shoes G have heads 35, which extend laterally inwardly. Each head 35 is provided with a downwardly facing wedge face 36 on the underneath side. Inwardly of the wedge face 36 of each shoe, the head is cut out to provide downwardly opening, transverse slots 37 of V-shaped form, thereby providing depending ribs 38 at the inner edges of the heads 35. The inner sides of the lower ends of the shoes G—G—G are provided with curved surfaces 39—39—39 similar to the curved surfaces 18—18—18 of the shoes B—B—B hereinbefore described.

The shoes G—G—G are wedged apart by a combined wedge and spring follower member H, which is in the form of a tubular, cup-shaped element made of spring steel. The cup-shaped member H has resilient arms 40 at its lower end similar to the arms 22 of the member C hereinbefore described, which arms bear on the curved surfaces 39 of the shoes B. At the upper end, the member H has three wedge faces 41—41—41 engaged with the wedge faces 36—36—36 of the shoes G—G—G. The top end of the member H is slotted to provide arms 42, which are bent inwardly and extend into the slots 37 of the shoes. The arms 42 press on the outer sides of the ribs 38 of the shoes, thus tending to force the shoes together at their upper ends and thereby assisting the lower arms 40 of the member H in maintaining the lower ends of the shoes spread apart.

I claim:

1. In a friction shock absorber, the combination with a casing having interior friction surfaces; of a plurality of friction shoes having sliding engagement with the friction surfaces of the casing, said shoes having inwardly facing wedge faces at their outer ends; a combined wedge and spring follower member in wedging engagement with said faces; springs within the casing yieldingly opposing inward movement of said member; and spring arms on said member bearing on the inner sides of said shoes at the inner end portions thereof.

2. In a friction shock absorber, the combination with a casing open at one end and closed at the other end by a transverse wall, said casing having interior friction surfaces at said open end; of a plurality of elongated friction shoes in sliding engagement with said friction surfaces, said shoes having inwardly facing wedge faces at their outer ends; a tubular, resilient follower member having wedge faces at its outer end in wedging engagement with the wedge faces of said shoes, the inner end of said tubular follower member flaring outwardly and being slotted lengthwise to provide resilient arms, said arms bearing on the inner sides of said shoes at the inner ends of the latter; and spring means within the casing yieldingly opposing inward movement of said tubular follower member.

3. In a friction shock absorber, the combination with a casing having interior friction surfaces; of a plurality of friction shoes slidingly telescoped within the casing, said shoes having laterally outwardly facing abutment means at the outer end portions thereof; a combined wedge and spring follower member in wedging engagement with the shoes near said outer ends thereof; springs within the casing reacting between said casing and member to yieldingly oppose inward movement of said member; and resilient spring arms on the inner and outer ends of said member, said spring arms at said inner end bearing on the inner sides of the shoes at the inner ends thereof, and said spring arms at said outer end bearing on said outwardly facing abutment means.

ROLAND J. OLANDER.

REFERENCES CITED

The following references are of record in the file of this patent:

UNITED STATES PATENTS

| Number | Name | Date |
|---|---|---|
| 1,026,113 | O'Connor | May 14, 1912 |
| 1,255,238 | Sherman | Feb. 5, 1918 |
| 1,290,304 | O'Connor | Jan. 7, 1919 |
| 1,862,764 | O'Connor | June 14, 1932 |
| 2,366,818 | Van Loan | Jan. 9, 1945 |
| 2,382,563 | Haseltine | Aug. 14, 1945 |